US011140906B2

(12) United States Patent
Bauer et al.

(10) Patent No.: US 11,140,906 B2
(45) Date of Patent: Oct. 12, 2021

(54) BUN SEPARATION

(71) Applicant: Prince Castle LLC, Carol Stream, IL (US)

(72) Inventors: Richard Bauer, Palatine, IL (US); Nathan Wicker, Chicago, IL (US); David Wylen, Chicago, IL (US); Peter Muller, Chicago, IL (US); Glenn Schackmuth, Oswego, IL (US); Thomas Tyrawa, Streamwood, IL (US); Marcus Frio, St. Charles, IL (US); Steve Shei, Fort Wayne, IN (US); Scott Rote, Mokena, IL (US); Quinton Ford, Chicago, IL (US); Tyler Greek, Plainfield, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 369 days.

(21) Appl. No.: 16/240,048

(22) Filed: Jan. 4, 2019

(65) Prior Publication Data
US 2019/0208793 A1 Jul. 11, 2019

Related U.S. Application Data

(60) Provisional application No. 62/613,993, filed on Jan. 5, 2018.

(51) Int. Cl.
*A47J 37/08* (2006.01)
*A21C 15/04* (2006.01)
(Continued)

(52) U.S. Cl.
CPC ............. *A21C 15/04* (2013.01); *A47J 37/044* (2013.01); *A47J 37/0857* (2013.01);
(Continued)

(58) Field of Classification Search
CPC . B26D 3/30; A47J 47/12; A47J 37/044; A47J 37/0857; A47J 37/0864;
(Continued)

(56) References Cited

U.S. PATENT DOCUMENTS 3,183,856 A 5/1965 Jolly
3,266,442 A 8/1966 Udall et al.
(Continued)

FOREIGN PATENT DOCUMENTS

CA 2923038 A1 12/2015
CN 105608794 5/2016
(Continued)

OTHER PUBLICATIONS

International Search Report and Written Opinion issued in corresponding PCT Application No. PCT/US2019/012316, dated Feb. 21, 2019.

*Primary Examiner* — Hung D Nguyen
(74) *Attorney, Agent, or Firm* — Andrus Intellectual Property Law, LLP

(57) ABSTRACT

A bun separator separates pre-sliced buns into portions. A bun feeder receives a pre-sliced bun having a plurality of portions and moves the pre-sliced bun along a first feed path. An obstruction is arranged relative to the first feed path and engages at least one portion of the plurality of portions of the pre-sliced bun. An actuator operates to selectively engage at least one portion of the plurality of portions of the pre-sliced bun against the obstruction to separate the least one portion of the pre-sliced bun and transfer the at least one portion to a second feed path.

17 Claims, 10 Drawing Sheets

(51) Int. Cl.
*B26D 3/30* (2006.01)
*A47J 37/04* (2006.01)
*A47J 47/12* (2006.01)
*A47F 1/12* (2006.01)

(52) U.S. Cl.
CPC ........... *A47J 37/0864* (2013.01); *A47J 47/12* (2013.01); *B26D 3/30* (2013.01); *A47F 1/125* (2013.01)

(58) Field of Classification Search
CPC ....... A47J 37/0871; A47J 39/00; A47F 1/125; A21C 15/00; A21C 15/002; A21C 15/007; A21C 15/04; G07F 11/28; B65G 2201/0202
USPC ................... 99/385, 386, 393, 443 R, 443 C
See application file for complete search history.

(56) References Cited

U.S. PATENT DOCUMENTS

| | | | |
|---|---|---|---|
| 3,343,715 | A | 9/1967 | Edwards |
| 3,915,316 | A | 10/1975 | Pomara, Jr. |
| 4,006,831 | A | 2/1977 | Jimenez |
| 4,034,661 | A | 7/1977 | Boosalis et al. |
| 4,054,015 | A | 10/1977 | Rowell |
| 4,261,257 | A | 4/1981 | Henderson et al. |
| 4,503,502 | A | 3/1985 | Chapin |
| 4,530,276 | A * | 7/1985 | Miller .................. A47J 37/0857 99/349 |
| 4,530,632 | A | 7/1985 | Sela |
| 4,547,851 | A | 10/1985 | Kurland |
| 4,553,222 | A | 11/1985 | Kurland et al. |
| 4,620,826 | A | 11/1986 | Rubio et al. |
| 4,677,888 | A | 7/1987 | Terragnoli |
| 4,760,777 | A | 8/1988 | Welsh |
| 4,797,818 | A | 1/1989 | Cotter |
| 4,919,950 | A | 4/1990 | Mak |
| 4,922,435 | A | 5/1990 | Cahlander et al. |
| 4,944,218 | A | 7/1990 | Cresson |
| 5,000,345 | A | 3/1991 | Brogna et al. |
| 5,127,544 | A | 7/1992 | Robinson et al. |
| 5,132,914 | A | 7/1992 | Cahlander et al. |
| 5,172,328 | A | 12/1992 | Cahlander et al. |
| 5,253,762 | A | 10/1993 | Duncan |
| 5,540,943 | A | 7/1996 | Naramura |
| 5,546,848 | A | 8/1996 | Naramura |
| 5,562,183 | A | 10/1996 | Naramura |
| 5,673,610 | A * | 10/1997 | Stuck .................. A47J 37/0857 99/349 |
| 5,724,886 | A | 3/1998 | Ewald et al. |
| 5,755,149 | A | 5/1998 | Blanc et al. |
| 5,763,861 | A | 6/1998 | Herrera et al. |
| 6,223,650 | B1 * | 5/2001 | Stuck .................. A47J 37/0857 99/349 |
| 6,236,974 | B1 | 5/2001 | Kolawa et al. |
| 6,298,331 | B1 | 10/2001 | Walker et al. |
| 6,473,739 | B1 | 10/2002 | Showghi et al. |
| 6,585,477 | B1 | 7/2003 | Lawrence |
| 6,647,864 | B1 | 11/2003 | Fang |
| 6,704,616 | B2 | 3/2004 | Formon |
| 6,751,525 | B1 | 6/2004 | Crisp, III |
| 6,930,296 | B2 | 8/2005 | Chen |
| 7,092,988 | B1 | 8/2006 | Bogatin et al. |
| 7,110,964 | B2 | 9/2006 | Tengler et al. |
| 7,141,258 | B2 | 11/2006 | Hillmann |
| 7,183,518 | B2 | 2/2007 | Near et al. |
| 7,353,136 | B2 | 4/2008 | Vock et al. |
| 7,478,749 | B2 | 1/2009 | Clothier et al. |
| 7,493,362 | B2 | 2/2009 | Bogatin et al. |
| 7,757,602 | B2 | 7/2010 | Aubry et al. |
| 7,885,852 | B2 | 2/2011 | Banerjee et al. |
| 8,307,951 | B2 | 11/2012 | Sus et al. |
| 8,448,567 | B2 | 5/2013 | Martin et al. |
| 8,458,311 | B2 | 6/2013 | Jang et al. |
| 8,498,896 | B2 | 7/2013 | Banerjee et al. |
| 9,049,875 | B2 | 6/2015 | Ewald et al. |
| 9,066,627 | B2 | 6/2015 | Baranowski et al. |
| 9,090,446 | B2 | 7/2015 | Crisp, III |
| 9,295,282 | B2 | 3/2016 | Vardakostas et al. |
| 9,326,544 | B2 | 5/2016 | Vardakostas et al. |
| 9,327,958 | B2 | 5/2016 | Angus et al. |
| 9,532,575 | B1 | 1/2017 | Donisi et al. |
| 9,585,401 | B2 | 3/2017 | Wiker et al. |
| 9,652,756 | B2 | 5/2017 | Knecht et al. |
| 9,701,530 | B2 | 7/2017 | Kline et al. |
| 9,718,568 | B2 | 8/2017 | Vardakostas et al. |
| 9,770,049 | B2 | 9/2017 | Vardakostas et al. |
| 9,788,687 | B2 | 10/2017 | Frehn et al. |
| 9,805,351 | B2 | 10/2017 | Harman |
| 10,067,109 | B2 | 9/2018 | Frehn et al. |
| 10,068,273 | B2 | 9/2018 | Frehn et al. |
| 10,086,525 | B2 | 10/2018 | Engel-Hall et al. |
| 2002/0059859 | A1 * | 5/2002 | Verklan .................... B26D 3/30 83/870 |
| 2003/0078793 | A1 | 4/2003 | Toth |
| 2004/0083201 | A1 | 4/2004 | Sholl et al. |
| 2004/0107141 | A1 | 6/2004 | Conkel et al. |
| 2004/0143503 | A1 | 7/2004 | Suthar |
| 2004/0238555 | A1 | 12/2004 | Parks |
| 2005/0049940 | A1 | 3/2005 | Tengler et al. |
| 2005/0182680 | A1 | 8/2005 | Jones, III et al. |
| 2007/0251521 | A1 | 11/2007 | Schackmuth et al. |
| 2008/0319864 | A1 | 12/2008 | Leet |
| 2009/0070229 | A1 | 3/2009 | Ansari et al. |
| 2009/0152345 | A1 | 6/2009 | Johnson |
| 2010/0049578 | A1 | 2/2010 | Salerno |
| 2010/0274633 | A1 | 10/2010 | Scrivano et al. |
| 2011/0256286 | A1 * | 10/2011 | Ewald .................. A47J 37/0857 99/387 |
| 2012/0143730 | A1 | 6/2012 | Ansari et al. |
| 2014/0324607 | A1 | 10/2014 | Frehn |
| 2014/0330686 | A1 | 11/2014 | Kulasooriya et al. |
| 2015/0013550 | A1 | 1/2015 | Lin |
| 2015/0019354 | A1 | 1/2015 | Chan et al. |
| 2015/0187027 | A1 | 7/2015 | Lowe |
| 2015/0199667 | A1 | 7/2015 | Fernando et al. |
| 2016/0026958 | A1 | 1/2016 | Lee |
| 2016/0183728 | A1 | 6/2016 | Moma-M04-Us1-App-Ads et al. |
| 2016/0235239 | A1 | 8/2016 | Patadia |
| 2016/0236367 | A1 | 8/2016 | Engel-Hall et al. |
| 2016/0244311 | A1 | 8/2016 | Burks et al. |
| 2016/0253084 | A1 | 9/2016 | Deville et al. |
| 2016/0330982 | A1 | 11/2016 | Frehn et al. |
| 2016/0338545 | A1 | 11/2016 | Shah et al. |
| 2016/0379293 | A1 | 12/2016 | Barajas Gonzalez et al. |
| 2017/0018041 | A1 | 1/2017 | Fox |
| 2017/0024789 | A1 | 1/2017 | Frehn et al. |
| 2017/0065117 | A1 | 3/2017 | Reese et al. |
| 2017/0116661 | A1 | 4/2017 | Sundaram |
| 2017/0208940 | A1 | 7/2017 | Boudreault |
| 2017/0215631 | A1 | 8/2017 | Studor et al. |
| 2017/0258257 | A1 | 9/2017 | Guh |
| 2017/0280763 | A1 | 10/2017 | Nazarian et al. |
| 2018/0186022 | A1 | 7/2018 | Fox et al. |

FOREIGN PATENT DOCUMENTS

| | | |
|---|---|---|
| DE | 102005012536 | 9/2006 |
| DE | 102015113398 | 2/2017 |
| EP | 296496 | 12/1988 |
| EP | 777201 | 6/1997 |
| EP | 1337170 | 3/2007 |
| WO | 199109558 | 7/1991 |
| WO | 2009120262 | 10/2009 |
| WO | 2013184910 | 12/2013 |
| WO | 2016079610 | 5/2016 |
| WO | 2017136605 | 8/2017 |
| WO | 2017177041 | 10/2017 |

* cited by examiner

BUN SEPARATION

CROSS-REFERENCE TO RELATED APPLICATIONS

The present application claims priority of U.S. Provisional Patent Application No. 62/613,993, filed on Jan. 5, 2018, the contents of which is hereby incorporated by reference in its entirety.

BACKGROUND

The present disclosure is related to the field of food preparation. More specifically, the present disclosure is related to systems and methods of handling baked goods for use in the assembly of sandwiches in a food preparation setting.

Many restaurant and food service settings, particularly quick service restaurants (QSR) use a combination of pre-prepared and on-demand prepared food components in order to assemble foods ordered by customers, for example, hamburgers or sandwiches within a customer's time expectation. While one approach to order assembly would be to sequentially prepare each food item constituent on demand in the order in which it is needed, customer food preparation time expectations in the QSR setting are not frequently met with such an approach.

Additionally, as the number of menu options and accommodation of customer special requests or customizations proliferate, there is a need for management of a greater number and variety of food items and constituents. Management of prepared food constituent inventory is more challenging as the number of food constituents increases. Also, as order assembly becomes more complicated, the assembly instructions are harder for food preparation workers to remember and correctly follow. This creates a greater learning curve for new or inexperienced workers or for the introduction of new menu items.

Bread, rolls, or other baked goods commonly form the structure on or within which the substance of a sandwich or other food item is held. Sandwiches, including hamburgers, club sandwiches, open-faced sandwiches, and wrapped sandwiches are commonly prepared foods in restaurants and kitchens. In the QSR, fast casual restaurant, or institutional kitchen setting, handling (and toasting, if necessary) of the baked good can take nearly half of the total time required to prepare the ordered sandwich. As a further challenge, if left exposed, baked goods can quickly become stale, prone to mold, or otherwise degrade in flavor.

Baked goods are often partitioned into slices or halves for thermal treatment, for example toasting and/or for use in assembling a sandwich. Baked goods can be sliced on demand, but this adds time and complexity to sandwich assembly processes. Baked goods can be provided pre-sliced, although if held separately once sliced, the interior of the baked good is susceptible to degradation when exposed to air. Therefore, baked goods are often supplied in a pre sliced, but complete condition. This adds a further challenge in that the partitioned pieces of the baked good must be separated and directed for individual treatment in the sandwich assembly process.

There is a trend in restaurants and food service for increased menu options and for accommodation of further customer custom requests. This adds to the complexity of food item orders and foodservice workers are less able to rely on memorization of food item recipes to assemble the order. Increased menu options and custom accommodations further contribute to slow the assembly of these food items.

Thus further solutions are needed for the handling and preparation of baked goods in a restaurant or foodservice setting, particularly in the separation and direction of baked goods into constituent component pieces.

BRIEF DISCLOSURE

An exemplary embodiment of a bun separator separates pre-sliced buns into a plurality of portions. The bun separator includes a bun feeder, an obstruction, and an actuator. The bun feeder is configured to receive a pre-sliced bun having a plurality of portions. The bun feeder moves the pre-sliced bun along a first feed path. The obstruction is arranged relative to the first feed path. The obstruction is configured to engage at least one portion of the plurality of portions of the pre-sliced bun. The actuator operates to selectively engage a least one portion of the plurality of portions of the pre-sliced bun against the obstruction to separate the least one portion of the pre-sliced bun and transfer the at least one portion to a second feed path.

In exemplary embodiments of the bun separator, the bun feeder may be a ramp that moves the pre-sliced bun along the first feed path by gravity. In exemplary embodiments of the bun separator, the bun feeder may be a conveyor operable in an advancing direction to move the pre-sliced bun along the first feed path.

The obstruction may be a restrictor arranged to laterally constrain a portion of the first feed path. In such an embodiment, the actuator may be a roller. In still further embodiments, the roller is part of a plurality of rollers with a belt extending between the plurality of rollers.

The obstruction may be a partition configured to engage at least one portion of the plurality of portions while permitting another at least one portion of the plurality of portions to pass beyond the partition. The partition may be arranged adjacent the first feed path. The partition may be elevated from the first feed path. The partition may be arranged across the feed path. The partition may be parallel to the feed path. The actuator may include a pusher that selectively engages a portion of the bun to separate the portions. The pusher may move by lateral translation across the first feed path.

In exemplary embodiments of the bun separator, the pre-sliced bun may be a club bun having heel, club, and crown portions. The pusher may further include a lateral arm that selectively extends across the first feed path. A transverse extension of the pusher may extend in the direction of the first feed path and include an exterior face and an interior face. The pusher extends across the first feed path. The pusher engages the heel with the exterior face and pushes the heel to the second feed path while the club portion drops into contact with the first feed path. Then the pusher withdraws across the first feed path and engages the club portion with the interior face, pulling the club portion to a third feed path while the crown portion drops to the first feed path.

In an exemplary embodiment of the bun separator, the actuator includes a pusher with a plurality of fingers that each engage a portion of the pre-sliced bun, and wherein the plurality of fingers are secured to pivot relative to each other across the pre-sliced bun. Another exemplary embodiment of the bun separator includes a wedge having a front tip and a wedge surface. The wedge is secured to an arm in a position that extends across a portion of the first feed path. The obstruction includes the front tip of the wedge and the actuator includes the rotation arm and wedge surface, wherein the wedge is pivotable about an axis of the arm by rotation of the arm to position at least one portion of the pre-sliced bun on the second feed path.

In exemplary embodiments of the bun separator, a holding cabinet is connected to the bun feeder. The holding cabinet is configured to maintain the pre-sliced buns in a controlled environment and selectively position the pre-sliced buns on the bun feeder. In exemplary embodiments of the bun separator, a toaster is arranged relative to the first feed path and the second feed path, wherein the toaster includes different toasting arrangements in alignment with the first feed path and the second feed path. The toaster may further include a separation plate to engage separated crown and heel portions and direct separated crown and heel portions into associated toasting paths.

DETAILED DISCLOSURE

As provided herein exemplary embodiments of devices and systems for handling and dispensing baked goods in a restaurant or food service setting. The systems and devices as disclosed herein can be exemplarily used to handle a wide variety of baked goods, including but not limited to buns, rolls, English muffins, croissants, bagels, muffins, flatbread, pitas, cakes, pastries, and so forth.

Figure 1:
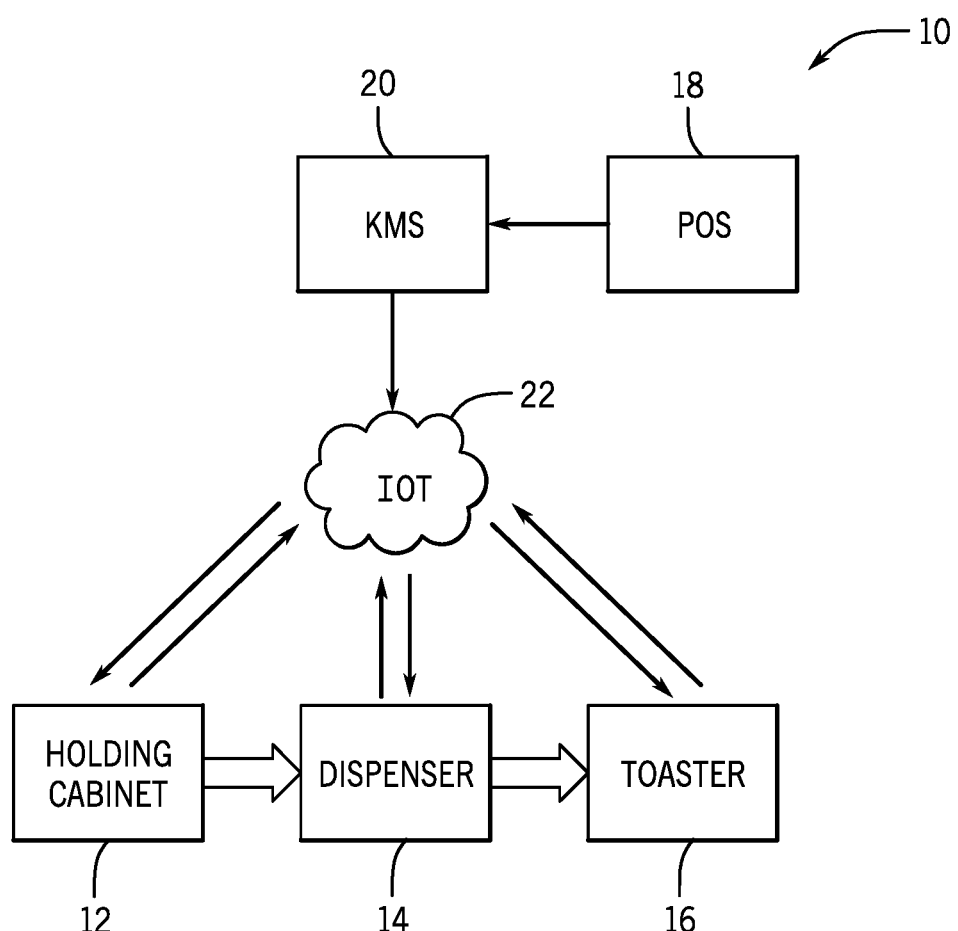
FIG. 1 is a system diagram of an exemplary embodiment of a baked goods handling system.

FIG. 1 is a system diagram of a baked good handling system 10 as will be described in further detail herein. The handling system 10 generally includes three components, a holding cabinet 12, a dispenser 14, and a treatment device, which may exemplarily be a toaster 16, as used in the present example. While these components will all be described in further detail herein, the holding cabinet 12 establishes and provides an environment conducive to extending the time that baked goods can be held without degradation in quality. The dispenser 14 selects an individual baked good from a plurality of baked goods which may all be the same or may include a variety of baked goods for dispense. The dispenser 14 delivers the baked good to an output location and may further include separation of the baked good into portions. The output location of the dispenser 14 may be a treatment device, for example, a toaster 16. The toaster 16 is operated to provide a required amount of heat to the baked good to create a palatable Maillard reaction in the baked good. While the example treatment device of a toaster is generally used herein, embodiments may use other types of treatment devices as well. Treatment devices may include apparatus to perform a treatment on a dispensed baked good, such treatments including, but not limited to steaming, heating, topping, or packaging. Therefore, other treatment devices within the scope of the present disclosure may include a steamer, a sauce dispenser, a condiment dispenser, or a packaging machine. Exemplary embodiments herein may describe the holding cabinet 12, dispenser 14, and toaster 16 as separate devices, however, it will be recognized from the present disclosure that in other embodiments, some or all of these components may be combined into an integrated device that performs two or more of the functions of these devices.

In an exemplary embodiment, a customer order is exemplarily received from a point of sale (POS) system 18, the customer order identifies one or more food products requiring assembly to complete the order. The customer order is exemplarily provided to a kitchen management system (KMS) 20 that identifies the components of each of the food products in the customer order and also exemplarily tracks, manages, and coordinates kitchen inventory and the order in which food products are processed, for example, with the baked good handling system 10. In doing so, the KMS 20 can provide control signals to each of the devices in the baked good handling system 10, and any other communication-enabled devices in the kitchen. The holding cabinet 12, the dispenser 14, and the toaster 16 are each communicatively connected to the KMS 20 to receive these instructions of the customer orders and the baked goods needed for the incoming orders. In embodiments, the KMS 20 may be directly connected to one or more of the holding cabinet 12, the dispenser 14, and the toaster 16. In other embodiments, an internet-of-things (TOT) communications system 22 may be intermediate to the POS system 18, the KMS 20 and the devices of the baked good handling system. The IOT communications system 22 may communicatively connect the KMS 20 to each of the holding cabinet 12, the dispenser 14, and the toaster 16, as well as to other communication enabled devices within the kitchen setting.

While the POS system 18 and the KMS 20 are depicted as separate systems, it will be recognized that the POS system 18 and the KMS 20 may be provided as a single integrated system. The POS system 18 and the KMS 20 may be provided locally to the rest of the baked good handling system 10, but may also be provided wholly or partially from a remote location, for example through a networked or cloud-computing enabled implementation. Food item orders are exemplarily received at the POS system 18. The interface to the POS system 18 may be a register computer operated by a cashier, a drive-through ordering system, or an online ordering system, or any other point of sale order entry arrangement as will be recognized by a person of ordinary skill in the art in view of the present disclosure. The POS system 18 takes in the customer order which specifies one or more food items which require preparation and/or assembly. In exemplary embodiments, one such food item may be a cheeseburger sandwich. The POS system 18 can provide this order information to the KMS 20 which operates to coordinate operation of the baked good handling system 10 as well as customer order completion and delivery and restaurant inventory, both in inventory storage as well as for example within the baked good handling system 10 as will be described in further detail herein.

The restaurant IOT system 22 is exemplarily a communication network that includes a locally or remotely located server system that manages communication between the KMS 20 and baked goods handling system 10, and other communication enabled devices in the kitchen. The restaurant IOT system 22 is exemplarily a cloud-computing enabled system whereby data collection and serving of data is handled by one or more processors and/or servers. In embodiments, the restaurant IOT system 22 may include one or more communication gateways that manage the distributed communication to the plurality of component devices and to any other communication enabled devices in the restaurant.

The restaurant IOT system 22 facilitates the communication between the KMS 20 and the baked goods handling system 10 to provide instructions/control messages/commands from the KMS to the component devices, and the IOT system 22 receives information back from the baked goods handling system 10 and relays this information to the KMS 20, for example, information related to device operation, current and/or used inventory or other operational parameters, including an identification of the device.

In operation, the POS system 18 receives the customer order, for example of a cheeseburger sandwich, and provides the order to the KMS 20. The KMS 20 identifies that the ordered cheeseburger sandwich requires a sesame seed roll. This instruction is provided to the holding cabinet 12 and/or to the dispenser 14 through the IOT system 22. The KMS may further identify that the sesame roll is to be toasted. This instruction is provided to the toaster 16. In embodiments, the holding cabinet 12 may operate to select from the plurality of baked goods held therein for dispense by the dispenser, while in other embodiments, the dispenser 14 may select the baked good from the holding cabinet 12 and dispense it. It will be recognized that in still further embodiments, the holding cabinet 12 and the dispenser 14 may be combined as a single unit.

The holding cabinet 12 operates to control the environment within which the baked goods are held. The control of the environment may include, but is not limited to, temperature, humidity, and chemical composition. Embodiments of the holding cabinet 12 may either hold the baked goods at a heated temperature or a cooled temperature in combination with a target humidity, which may also be based upon the selected temperature. Further, the holding cabinet 12 may modify or control the composition of the gases in the environment to lower the oxygen content of the environment, for example with additional Nitrogen or Carbon Dioxide, which may inhibit oxidation and bacterial growth. These controls and operations by the holding cabinet 12 may help to keep the baked goods to stay fresh longer before toasting.

The dispenser 14 conveys, either by gravity or active conveyance, the bun to the toaster 16. The dispenser 14 may further include a separator that operates to separate the bun into two or more portions (e.g. crown and heel, or crown, club, and heel) for toasting individual components of the bun. The toaster 16 is communicatively connected to the KMS 20 through the IOT communication system 22 and receives an instruction that the selected baked good (sesame seed roll) is to be toasted. The toaster 16 may use this information to adjust one or more settings of the toaster 16 to create desired conditions for toasting of the selected baked good. It will be recognized that in embodiments, automation of bun toasting may eliminate human error of being incorrectly loaded into the toaster or the toasting of the wrong type of bun for the customer order. Non-limiting embodiments of toasters, features of which may be used in exemplary embodiments of baked goods handling systems 10 are described in "Toaster with Removable and Adjustable Conveyors", U.S. Patent Application Publication No. 2010/0275689 and "Toaster with Adjustable Conveyor", U.S. Patent Application Publication No. 2018/0289209, which are hereby incorporated by reference herein in their entireties.

The holding cabinet 12, the dispenser 14, and the toaster 16 may communicate back to the KMS 20 through the TOT system 22 to report a status of that device and/or that an operation has been completed. In this manner, the KMS 20 can track the progress of the baked good through its handling by the system 10. Additionally, this can facilitate inventory tracking, for example within the KMS 20. The KMS 20 may track the available inventory and/or conditions within the holding cabinet 12. In further embodiments, communication between the holding cabinet 12 and the KMS can be used to track the age of baked goods within the holding cabinet 12. The location of particular baked goods within the holding cabinet 12 may further be tracked to facilitate the determination and tracking of the particular age of baked goods. In embodiments, the age of baked goods may be tracked in terms of minutes or hours since the baked goods were loaded into the holding cabinet 12. The KMS 20 and/or the holding cabinet 12 may provide an indication when one or more types of baked goods held therein must be replenished. This replenishment may be based upon exceeding determined holding time for baked goods within the holding cabinet or may be based upon depletion of the stock of a particular baked good through use by the system. Exemplary embodiments of baked goods handling systems are further described in co-pending "Baked Good Handling System" U.S. patent application Ser. No. 16/209,437 filed on Dec. 4, 2018, which is incorporated by reference herein in its entirety.

Figure 2:
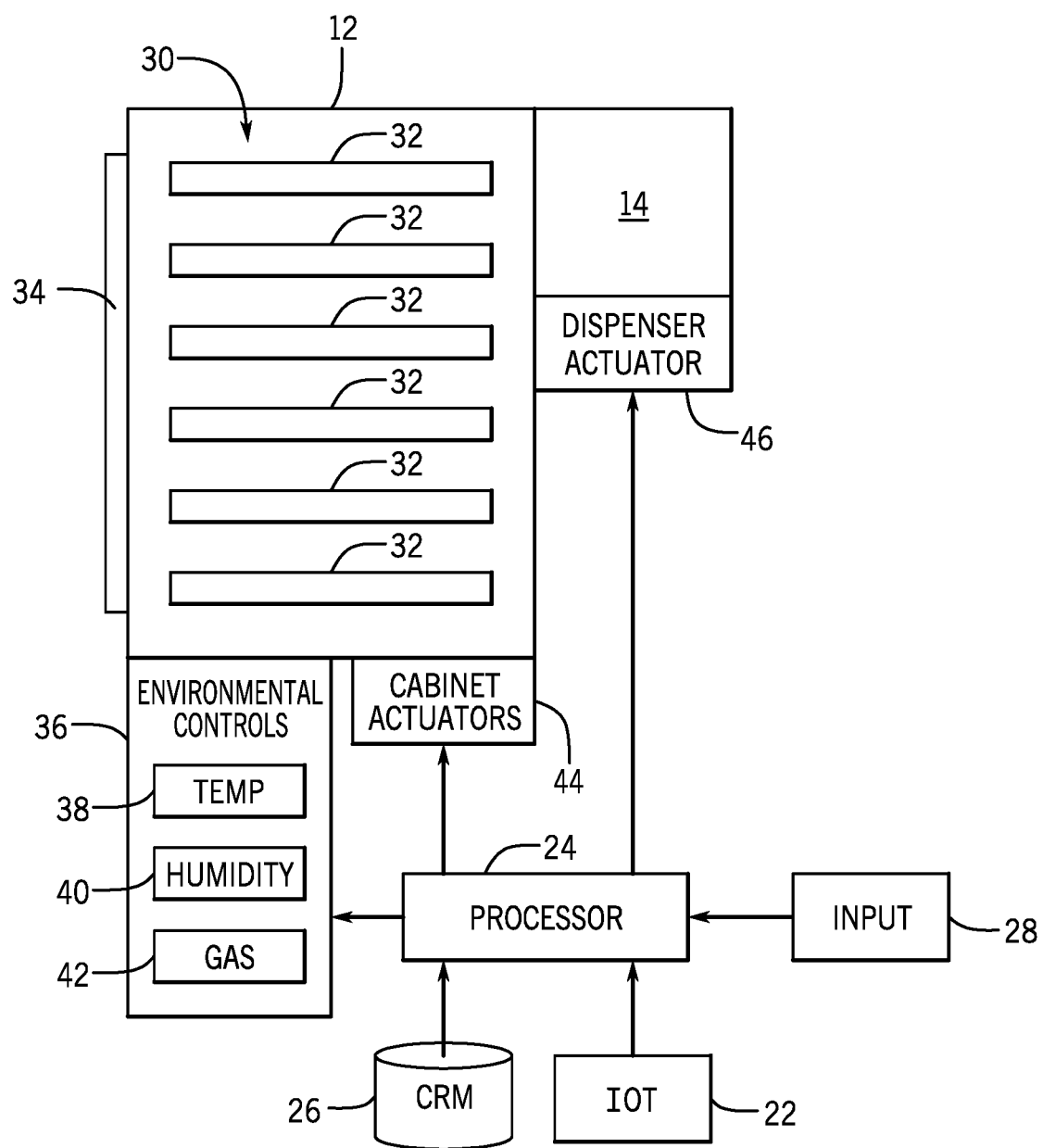
FIG. 2 is a system diagram of an exemplary embodiment of a holding cabinet.

FIG. 2 is a system diagram of an exemplary embodiment of a holding cabinet 12. As previously noted, the holding cabinet and the dispenser may be separate devices, but the embodiment presented in FIG. 2 depicts an embodiment that exemplarily combines the holding cabinet 12 and the dispenser 14 into a single system/device which may be contained within a single housing.

A processor 24 is communicatively connected to the IOT communication system 22, as described above with respect to FIG. 1. The processor 24 receives the instructions regarding a bun required to assemble an ordered sandwich. The processor 24 coordinates the operations and functions of the bun holding cabinet 12 and the dispenser 14 by providing control signals and instructions to various components of the system and collecting data and information from the operation of the system to report back to the KMS through the IOT communication system 22. As used herein, the term processor means any of a variety of known controllers, microcontrollers, integrated circuits, and/or printed circuit boards comprising electronic to read and execute computer readable code to produce instructions and control commands as described in further detail herein. The processor 24 is further communicatively connected to a computer readable medium (CRM) 26, which is non-transient and stores computer readable code that is executable by the processor, and upon execution causes the processor to carry out the functions and operations as described in further detail herein.

The processor 24 is further connected to at least one input device 28 associated with the bun holding cabinet 12. The input device 28 may exemplarily include, but is not limited to, a keyboard and/or a touchscreen interface. The input device 28 is operable by a foodservice worker to perform a manual entry of a control or operation of the bun holding cabinet 12 rather than the instructions received by the processor 24 from the KMS 20 through the TOT communication system 22. In an embodiment, the foodservice worker may use the input device 28 to request a dispense of a particular bun for a special order sandwich to be prepared manually, or as a replacement for a bun damaged elsewhere during assembly of the sandwich. The foodservice worker may have the option to input or control any of the parameters and functions as described herein.

The bun holding cabinet 12 includes a compartment 30 that defines an enclosed area within which a plurality of trays 32 of buns are held. The trays 32 may be standardized trays in which the buns are baked or received by the restaurant. In such embodiments, the trays 32 may be loaded into the compartment 30 through a door 34 in the bun holding cabinet 12. In other embodiments, the trays may be of a different configuration and the buns are transferred into specifically designed trays 32 that are kept in the compartment 30 or are transferred into and out of the compartment 30. Further embodiments are described in additional examples provided herein, but embodiments of trays may include conveyors, pushers, or be configured to work in conjunction with such actuators located within the cabinet to operate to dispense buns therefrom.

The processor 24 is communicatively connected to one or more environmental control devices 36. The environmental control devices 36 include a temperature control 38 which may include a heating element and/or a refrigeration element depending upon the conditions for optimal holding of the bun within the compartment 30. The environmental control devices 36 further include humidity control 40, which may include a humidifier and/or a dehumidifier to add or remove moisture from the compartment 30. The environmental control devices 36 further include gas concentration control 42 which may include supplies of gasses, for example, but not limited to, nitrogen or carbon dioxide that can be added to the compartment 30 to preserve bun freshness and inhibit spoilage before the buns are dispensed. While not depicted in FIG. 2, each of these environmental control devices 36 include associated sensors related to the environmental conditions to be controlled, these may include temperature sensors, humidity sensors, and gas composition sensors.

The processor 24 is communicatively connected to at least one cabinet actuator 44. The cabinet actuator 44 exemplarily operates to move the buns within the compartment to control the type and order in which buns are removed from the compartment 30. Exemplary embodiments of types of cabinet actuators 44 are described in further detail herein, although some embodiments may move the entire tray 32, while other embodiments may move individual buns or groups of buns relative to a respective tray 32 within the compartment 30. Exemplary embodiments may include mechanical elevators, lifts, or conveyors to position the trays 32 within the compartment 30. As previously noted the trays themselves 32 may include conveyors, pushers, or lifts, or be configured to operate with these cabinet actuators 44 within the compartment 30 to move individual buns off of a tray and out of the compartment 30. In other embodiments, the bun holding cabinet 12 may include the conveyors, pushers, or lifts, for example as embodiments of cabinet actuators 44. These cabinet actuators may be arranged to operate to selectively move buns off of the trays 32. In still further embodiments, the cabinet actuator 44 may include a door or gate, as described herein to control the dispense of buns out of the compartment 30.

In still further embodiments, the bun holding cabinet 12 may include one or more sensors positioned relative to an outlet of the compartment 30. In such embodiments, the cabinet actuators 44 may be operated to move a bun from one of the trays 32 into a queued position relative to the outlet of the compartment 30. When the bun is requested by the KMS, the bun in the queued position is dispensed. In another embodiment, sensors may be arranged within the compartment 30 so as to identify a location of a next bun to be dispensed from the cabinet. With the location of this bun identified, the bun holding cabinet 12 can operate to dispense that bun upon request. In still further embodiments, the cabinet actuators may operate to advance one or more buns towards the outlet of the compartment 30. One or more sensors detect when a bun leaves the outlet and advance of the buns within the compartment 30 is stopped.

The processor 24 is communicatively connected to at least one dispenser actuator 46 of the dispenser 14. The dispenser actuator 46 operates to manipulate the bun between the holding cabinet 12 and the treatment device which may be a toaster 16. In embodiments, the dispenser 14 may include one o more different types of actuators 46. The actuator 46 may be a gate or a diverter along a feed path of the dispenser. The gate or diverter may operate to direct or control the advance of the entire re-sliced bun along a first feed path or a second feed path towards the toaster. As previously noted, the dispenser 14 in embodiments is integrated with the bun holding cabinet 12. The dispenser 14 may include a gate, which may be in the form of a door, to control the exit of a bun from the bun holding cabinet 12, the dispenser may include a conveyor or other powered manner of moving the bun from the bun holding cabinet 12 to the toaster (not depicted).

In other embodiments, the actuator 46 may include a portion of a bun separator as described in further detail herein. The bun separator separates the portions of a pre-sliced bun (e.g. crown and heel, and optionally a club section) and may direct a bun or a portion of a bun into a particular lane of a toaster. The lane of the toaster may be configured for particular toasting requirements specific to a bun portion. The actuators 46 of the bun separator operate to engage the bun and separate the pre-sliced bun into portions.

Figure 3:
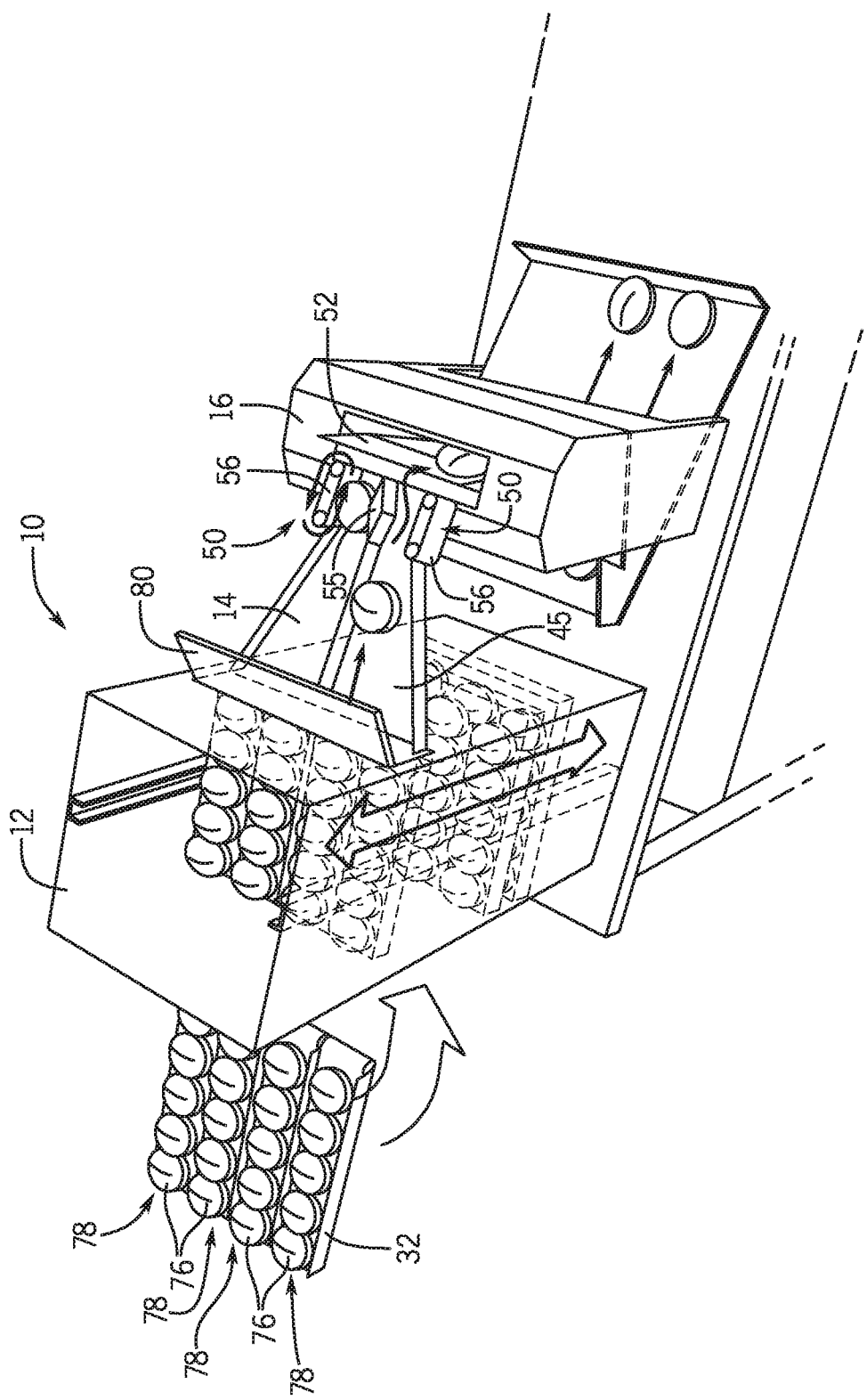
FIG. 3 depicts a further exemplary embodiment of a baked goods handling system.

FIG. 3 depicts another exemplary embodiment of a baked goods handling system 10 within the scope of the present disclosure. The holding cabinet 12 receives trays 32 of the baked goods (e.g. buns 76) for holding and dispensing. In an exemplary embodiment, the trays 32, and/or portions of trays 32, and/or individual chutes 78 of trays 32 are movable within the holding cabinet 12 to provide for a selection of a variety of baked good types either all available at a dispensing position or movable to be arranged at the dispensing position.

The dispenser 14 includes a bun feeder that is exemplarily a ramp 45 that conveys by gravity to position a bun 76 relative to the toaster 16. However, it will be recognized that in other embodiments, the bun feeder may be a driven conveyor that moves the bun 76 from the holding cabinet 12 to the toaster 16. It has been recognized by the inventors that even when baked goods have been pre-sliced (e.g. pre-sliced buns or bread), that the environmental conditions that promote the preservation of baked good quality also can cause the portions (e.g. crown and heel) to fuse or stick at the sliced interface. Therefore, additional mechanical separation in the dispense of baked goods is needed in embodiments to be able to properly direct bun portions into the toaster 16 and/or to particular toasting paths of the toaster 16. The toaster 16 may include a separation plate 52 that divides the toasting paths and also extends above the toasting paths to present a physical obstruction against which the bun may strike to further separate the bun portions. The dispenser 14 drops the bun 76 down the ramp 45 towards the toaster 16 from a sufficient height such that when the bun 76 strikes the separation plate 52, the bun 76 separates into the two halves and each half is directed into a toasting path of the toaster 16.

In still further embodiments, an additional bun separator 50 may be provided. As better depicted in FIG. 4, which will be described in further detail herein, the bun separator may be positioned at any position along the dispenser 14, at the dispensing position of the holding cabinet 12, or at the toaster 16. As depicted in FIG. 3, the bun separator may be located at the end of the dispenser 14 and used in connection with a separation plate 52 of the toaster 16. The bun separator 50 exemplarily includes a restriction 54 caused by an obstruction 55 and a conveyor 56. The restriction 54 is exemplarily a narrowed portion of the ramp 84 that narrows to a dimension smaller than a diameter of the bun 76. The restriction 54 exemplarily causes lateral compression of the bun as it moves through the restriction 54 which can force the bun halves apart. The conveyor 56 engages the bun 76 with a belt configured in a manner such as to move the bun 76 without damage thereto. The conveyor 56 places additional force on the bun 76 to move the bun 76 through the restriction 54 past the obstruction 55. The bun 76 laterally compresses to move past the obstruction 55 and this compression forces disengagement between the pre-sliced bun portions, setting the bun up for separation.

Figure 4:
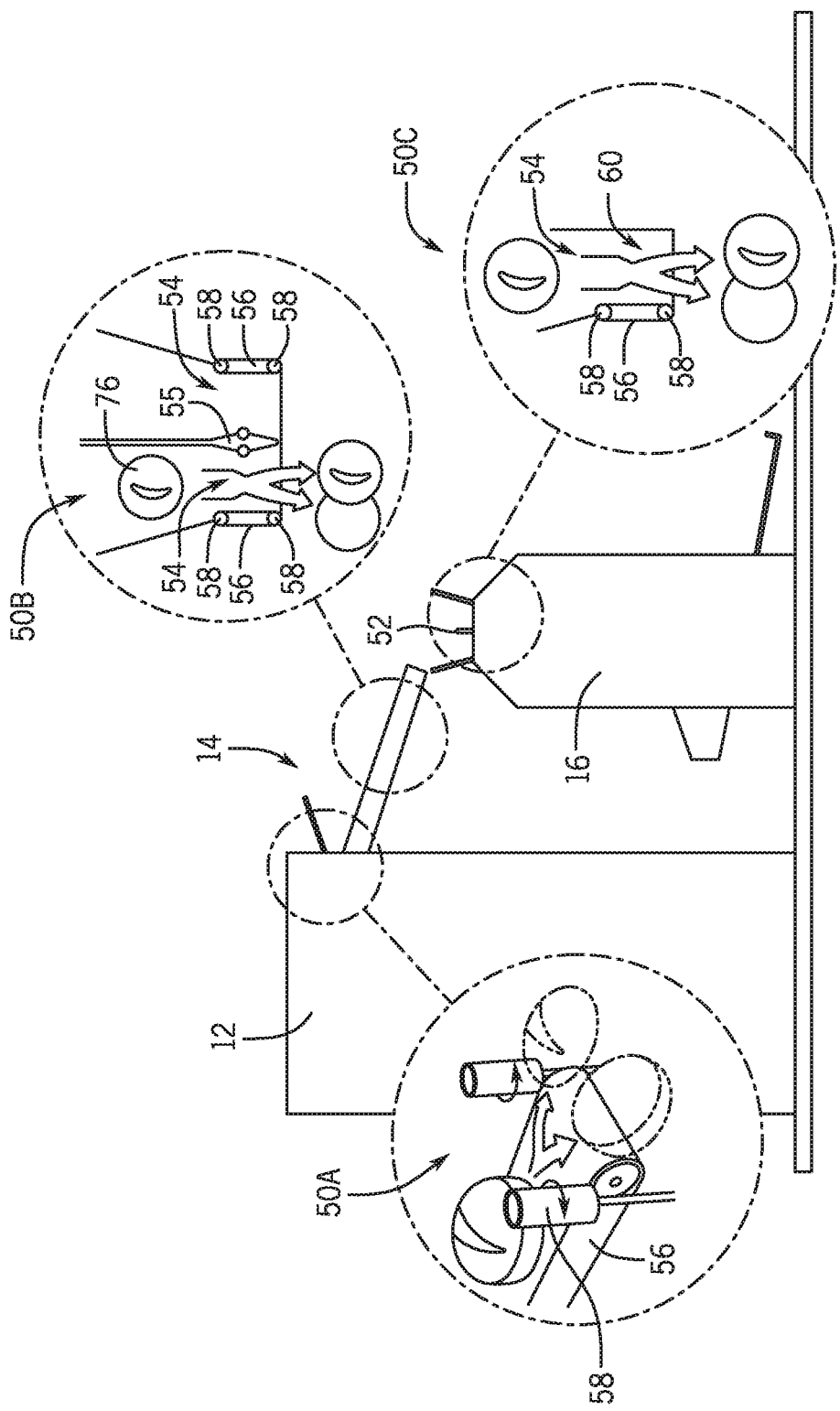
FIG. 4 depicts exemplary embodiments of bun separators.

Exemplary embodiments and positions of bun separators 50 are depicted and described with respect to FIG. 4. Different embodiments of bun separators 50A-C shown in FIG. 4 demonstrate some examples of ways in which the dispenser 14, the holding cabinet 12, or the toaster 16 may separate the bun portions. As shown with respect to bun separator 50A, the conveyor 56 may exemplarily be located at the bottom surface, such as in a manner to advance the bun 76. The restriction 54 is exemplarily provided obstructions configured as rollers 58 arranged adjacent the conveyor 56. These rollers 58 can provide the restriction/compression of the bun, but due to the movement offered by the rollers, may be more gentle on the bun. Bun separator 50C is exemplarily arranged vertically, or near vertically. Due to the orientation of the bun, a specific mechanical restriction is provided by the rollers 58 reducing the dimension of the opening 60 may provide any restriction in combination with the conveyor 56.

While various embodiments of bun separators 50 are described above, it will be recognized that still further embodiments of bun separators 50 may be used within the embodiments of the dispensers 14 and/or handling systems 10 as described herein. These still further embodiments include, but are not limited to embodiments wherein the bun portions are individually mechanically engaged. For example, offset rollers, bump outs, or conveyors may be configured to create a restriction and engagement of one or the other of bun portions. In an example, this may also create directionality to the separation of the bun portions, and help to direct the bun portions to different toasting paths. In still further embodiments, a wedge, blade, crossbar, crosswire may ne an obstruction of the bun at the interface between the bun portions, an applied force to the bun, for example by a conveyor may force the bun portions to separate to move the, now separated, bun portions past the obstruction.

The inventors have further recognized that while the solutions disclosed above may be suitable for separation of halved buns, that club buns (e.g. with three sections—crown, club, and heel) present further challenges to the automated dispense of buns into the appropriate toasting paths of a toaster to facilitate preparation of a sandwich order.

FIGS. 5A-E depict an exemplary embodiment of a bun separator 50 and the operation thereof. The bun separator 50 is arranged adjacent to a toaster 16. The toaster 16 includes a plurality of toasting paths 62A-C. In the exemplary embodiment shown herein, the toasting path 62A is configured to toast a heel portion of a bun 48. Toasting path 62B is configured to toast a crown portion of the bun 48 and toasting path 62C is configured to toast a club portion of the bun 48. It will be recognized that in an exemplary embodiment a toasting path 62A, 62B configured to toast a crown or a heel portion exemplarily move a bun portion along a heating element arranged to one side of the bun portion while a toasting path 62C configured to toast a club portion has heating elements arranged to both sides of the club portion within the toaster 16.

The bun separator 50 includes a conveyor 56 that is operable to advance a bun 48 in the direction of arrow 64 towards the toaster 16. The bun 48, as depicted and described herein is exemplarily a club bun which includes a heel portion 48A, a club portion 48B, and a crown portion 48C. It will be recognized that similar embodiments as described herein may operate to separate a bun that includes only a heel and a crown, as such bun separation is carried out similarly, yet only requiring the separation of two bun portions.

The bun separator 50 includes obstructions that are in the form of partitions 66. The partitions 66 are oriented adjacent to the bun 48 and are oriented parallel to a first feed path 68 along the conveyor 56. The partitions 66 are elevated above the conveyor 56 such that the partition 66 includes a space 70 configured for a portion of the bun 48 to pass therethrough while the portions of the bun 48 above the lower most portion engage with the partition 66 blocking those portions from lateral movement as described in further detail herein. The bun separator 50 further includes at least one pusher 72.

Figure 5A:
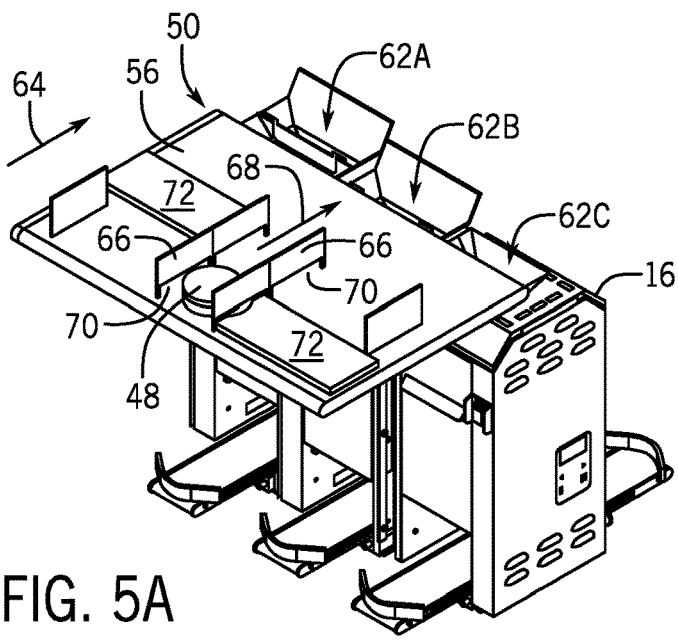
FIGS. 5A-E depict the operation of an exemplary embodiment of a bun separator.
Figure 5B:
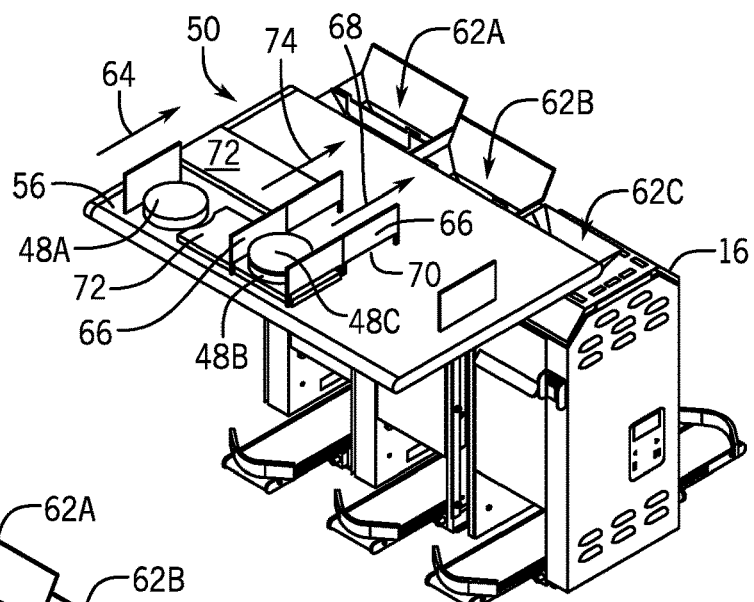

In FIG. 5A, the bun 48 is positioned on the conveyor 56 along the first feed path 68. The conveyor 56 may receive the bun 48 exemplarily from a bun holding cabinet (not depicted). The bun 48 is positioned along the first feed path in alignment with a partition 66. As shown in FIG. 5B, a pusher 72 is actuated and an exterior face of the pusher engages the bun 48, and particularly, engages the bun 48 at the heel portion 48A. The club portion 48B and crown portion 48C are first moved along with the heel portion 48A until the club portion 48B and crown portion 48C engage the partition 66 and the force from the pusher 72 separates the heel portion 48A from the club portion 48B and pushes the heel portion 48A through the slot 70 and onto a second feed path 74. The second feed path 74 is in alignment with the first toasting path 62A.

Figure 5C:
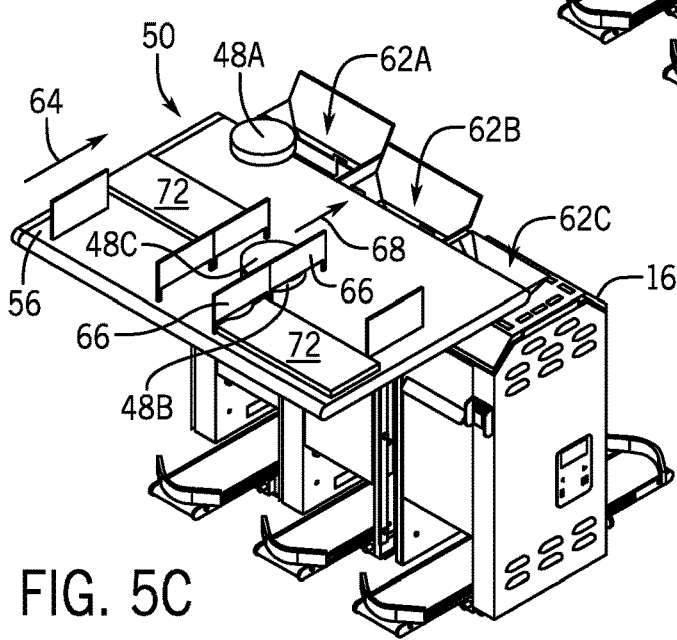
Figure 5D:
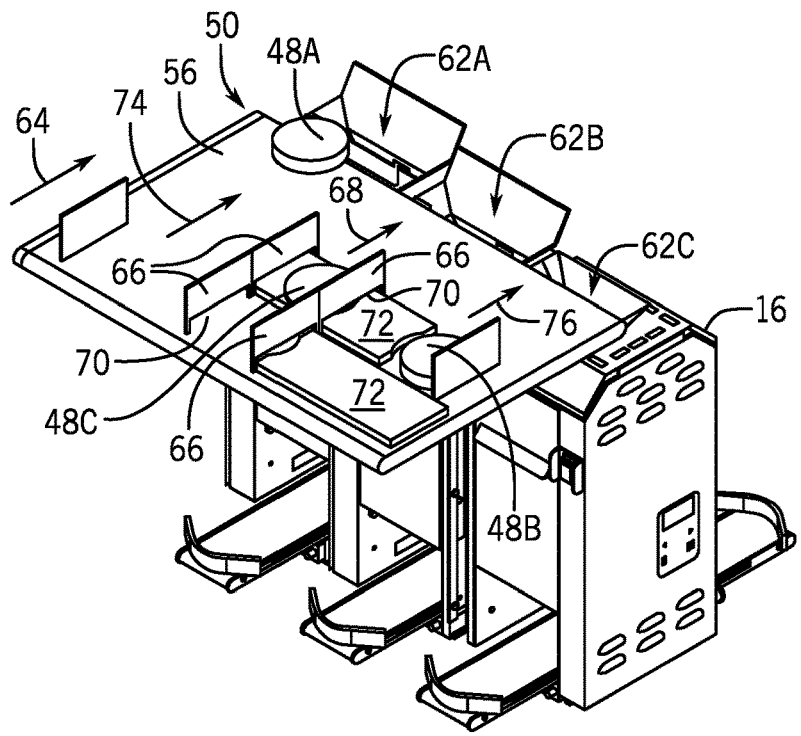

Next, at FIG. 5C, the pusher 72 is withdrawn and the club portion 48B exemplarily engages a partition 66 on the pusher side and drops onto the conveyor 56 along the first feed path 68. The club portion 48B and the crown portion 48C are advanced by the conveyor 56 along the first feed path 68 until the club portion 48B and the crown portion 48C are in alignment with the second partition 66. As depicted in FIG. 5C, the pusher 72 advances in a direction perpendicular to the first feed path 68 and engages the club portion 48B and moves the club portion 48B and crown portion 48C in a direction perpendicular to the first feed path 68. The crown 48C engages the partition 66 and the force from the pusher 72 separates the club portion 48B from the crown portion 48C and the club portion 48B passes through the slot 70 in the partition 66. The pusher 72 moves the club portion 48B onto a feed path 76 on the conveyor 56 that directs the club portion 48B into the toasting path 62C of the toaster 16.

Figure 5E:
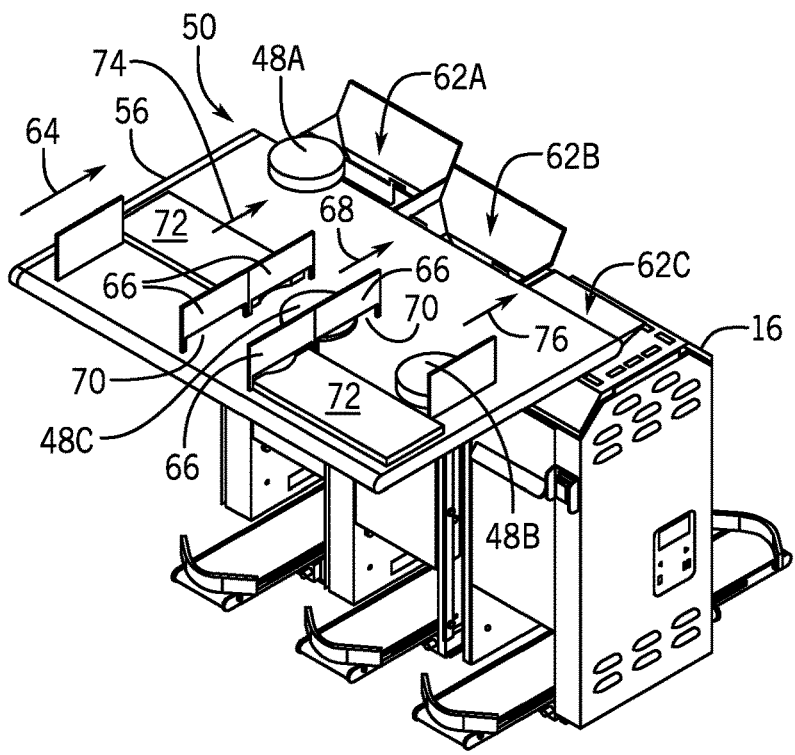

As shown in FIG. 5E, the pusher 72 withdraws and the crown portion 48C engages the partition 66 which slides the crown portion 48C off of the pusher 72 and the crown portion 48C drops onto the conveyor 56 on the first feed path 68. In this manner, the bun separator 50 separates the club bun 48 into the respective heel portion 48A on a feed path 74 in alignment with the toasting path 62A, the crown portion 48C on the first feed path 68 in alignment with the toasting path 62B and the club portion 48B on a further feed path 76 in alignment with the toasting path 62C. Further advancement of the conveyor 56 in the direction of arrow 64 moves each of the heel portion 48A, club portion 48B, and crown portion 48C into the toaster 16.

Figure 6A:
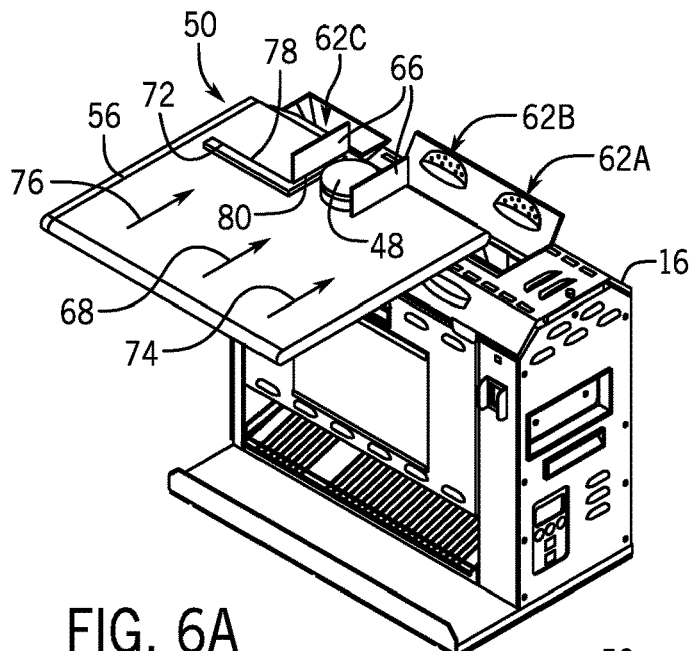
FIGS. 6A-C depict the operation of an exemplary embodiment of a bun separator.
Figure 6B:
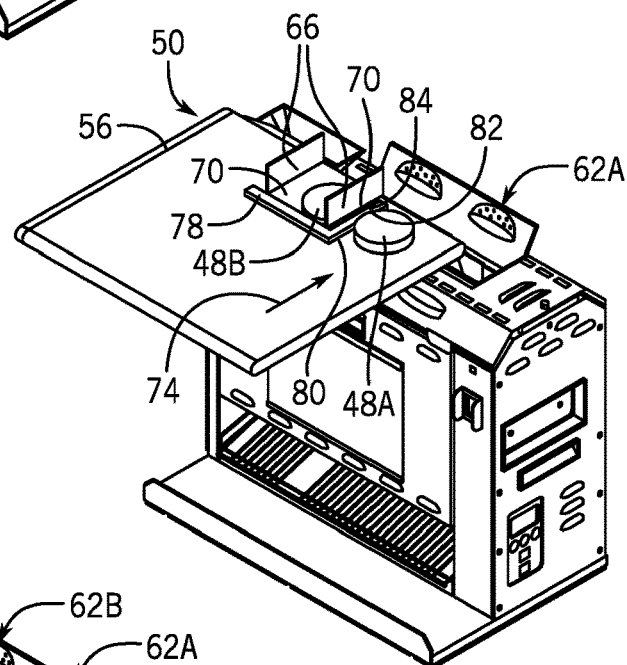
Figure 6C:
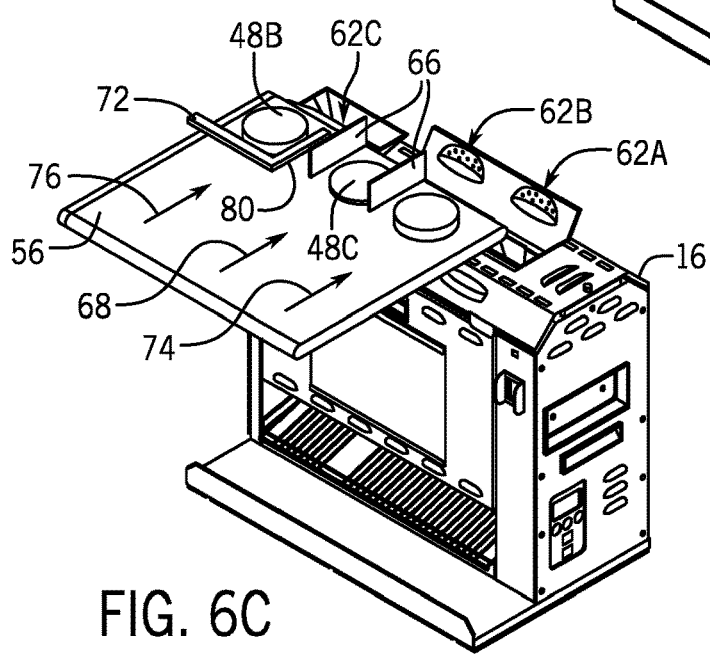

FIGS. 6A-C depict an exemplary embodiment of a bun separator 50 and the operation thereof. The bun separator 50 is similar to that as shown and described above with respect to the bun separator 50 of FIGS. 5A-E. Like reference numerals are used between the Figures in order to denote like features between the embodiments described herein. In the bun separator 50, a conveyor 56 is arranged as the bun feeder and a bun 48 is received on the conveyor 56 along a first feed path 68. When the bun 48 is advanced to a position adjacent to partitions 66, the conveyor 56 stops advancement of the bun 48 along the feed path 68 and a pusher 72 is actuated. The pusher 72 includes a lateral arm 78 and a transverse extension 80 from the lateral arm. The transfer extension 80 includes an exterior face 82 and an interior face 84. The exterior face 82 of the transverse extension 80 of the pusher 72 engages the heel portion 48A and pushes the entire bun 48 until the club portion 48B and the crown portion 48C engage the partition 66 and continued force by the pusher 72 separates the heel portion 48A from the club portion 48B as the heel portion 48A passes through the slot 70 of the partition 66 to move the heel portion 48A onto a feed path 74 that is in alignment with the toasting path 62A. In doing so, the pusher 72 advances such that the transfer extension passes through the slot 70 beyond the partition 66 and the club portion 48B falls behind the transverse extension 80 onto the conveyor 56. As the bun separator 50 withdraws the pusher 78, the interior surface 84 of the transverse extension 80 engages the club portion 48B and moves the club portion 48B and the crown portion 48C along with the pusher 72 until the crown portion 48C engages the partition 66. Continued force from the interior face 84 of the transverse extension 80 onto the club portion 48B separates the club portion 48B from the crown portion 48C and the club portion 48B moves through the slot 70 of the partition 66 under force from the pusher 72. This moves the club portion 48B into alignment with a feed path 76 that is in alignment with the toasting path 62C. As the transverse extension 80 of the pusher 72 retracts beyond the partition 66, the crown portion 48C falls to the conveyor 56 and is thus in place on the feed path 68. The conveyor 56 advances to move each of the bun portions into the associated toasting path of the toaster 16.

FIGS. 7-11 present still further exemplary embodiments of bun separation in accordance with the present disclosure. A person of ordinary skill in the art will recognize from the present disclosure that components between the various embodiments may be combined and recombined with more or fewer components to arrive at still further embodiments within the scope of the present disclosure. Like reference numbers are used between embodiments. While some arrangements are depicted splitting club buns and other splitting regular buns, it will be recognized that the disclosures may be adapted to split either type of bun or other bun configurations.

Figure 7:
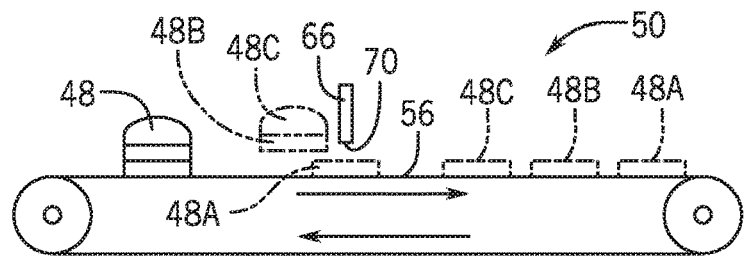
FIG. 7 is a schematic diagram of a bun separator.

FIG. 7 depicts a further exemplary embodiment of a bun separator 50. The bun separator 50 includes a conveyor 56 with a partition 66 as an obstruction. However, the partition 66 is arranged across the feed path of the conveyor 56. The conveyor 56 advances the bun 48 until the club portion 48B and crown portion 48C engages the partition 66. This force separates the heel portion 48A which passes through the slot 70 in the partition 66. Once the club portion 48B falls to the conveyor 56, the same process occurs again, this time with the crown portion 48C engaging the partition 66 and the club portion 48B breaking free and passing through the slot 70.

Figure 8:
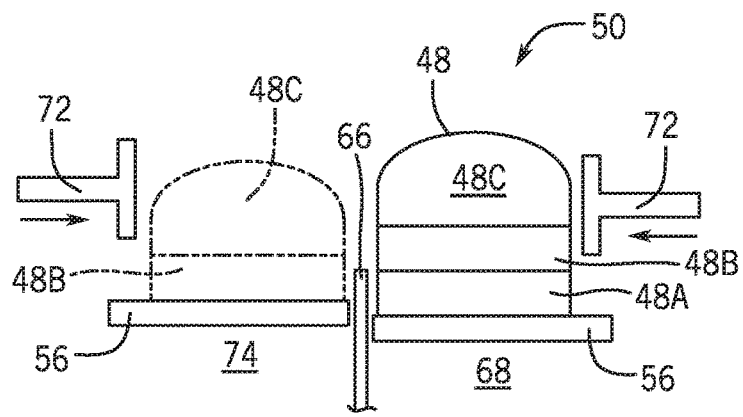
FIG. 8 is a schematic diagram of a bun separator.

FIG. 8 depicts another exemplary embodiment of a bun separator 50. Bun separator 50 exemplarily includes two conveyors 56 with each conveyor representing a different feed path of feed paths 68 and 74. The bun 48 starts on the conveyor 56 of the first feed path 68 until the bun 48 is in alignment with a partition 66, as an obstruction, that is parallel to the feed path 68. The partition 66 is exemplarily arranged to be adjacent the first feed path such that upon the pusher 72 engaging the bun 48, the heel portion 48A instead engages the partition 66 and further force from the pusher 72 on the club portion 48B and the crown portion 48C separates the crown portion 48B from the heel portion 48A and moves the crown portion 48C and the club portion 48B onto the conveyor 56 of the other feed path 74. In an embodiment, another pusher 72 may engage the crown portion 48C and force the club portion 48B back into engagement with the partition 66 in a manner so as to separate the crown portion 48C from the club portion 48B. In an embodiment, the heel portion 48A may be moved out of the way from the crown portion 48C, or the crown portion 48C maybe deposited onto the heel portion 48A. In embodiments of toasters 16 as described above with respect to FIG. 3, which includes a separation plate 92, crown and heel portions having been pre-separated may be deposited into a combined toasting path in which the crown and heel portions are directed into toasting paths by the separation plate 92.

Figure 9:
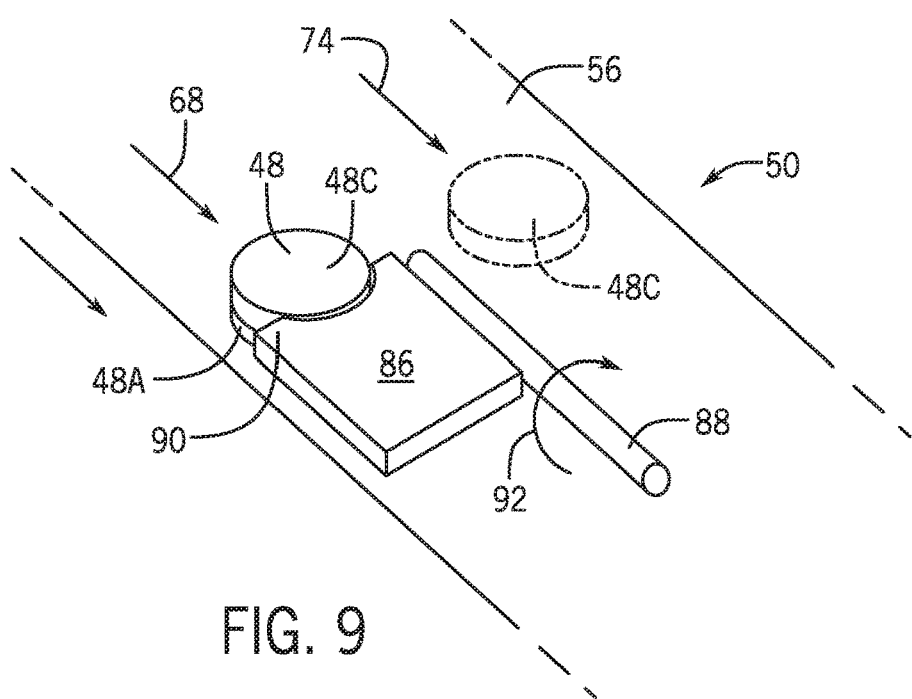
FIG. 9 is a schematic diagram of a bun separator.

FIG. 9 depicts a still further embodiment of a bun separator 50. The bun separator 50 includes a conveyor 56 as the bun feeder and the bun 48 starts on a feed path 68. The bun separator 50 includes a wedge 86 that is secured to an arm 88. The arm 88 is exemplarily arranged along the direction of the feed path 68. The wedge 86 includes a front tip 90 which may exemplarily be sharpened or narrowed. The front tip 90 forms an obstruction into which the conveyor 56 moves the bun 48 into engagement. Starting at the front tip, the advancement of the conveyor 56 separates the portions of the bun 48 and the exemplary crown portion 48C moves on top of the wedge 86. With the crown 48 positioned on the wedge 86, the arm 88 actuates to rotate in the direction of arrow 92 to flip the crown portion 48 over onto the conveyor 56 on another feed path 74. The conveyor 56 may advance the separated bun portions while the arm 88 returns to the original position to split a subsequent bun 48.

Figure 10:
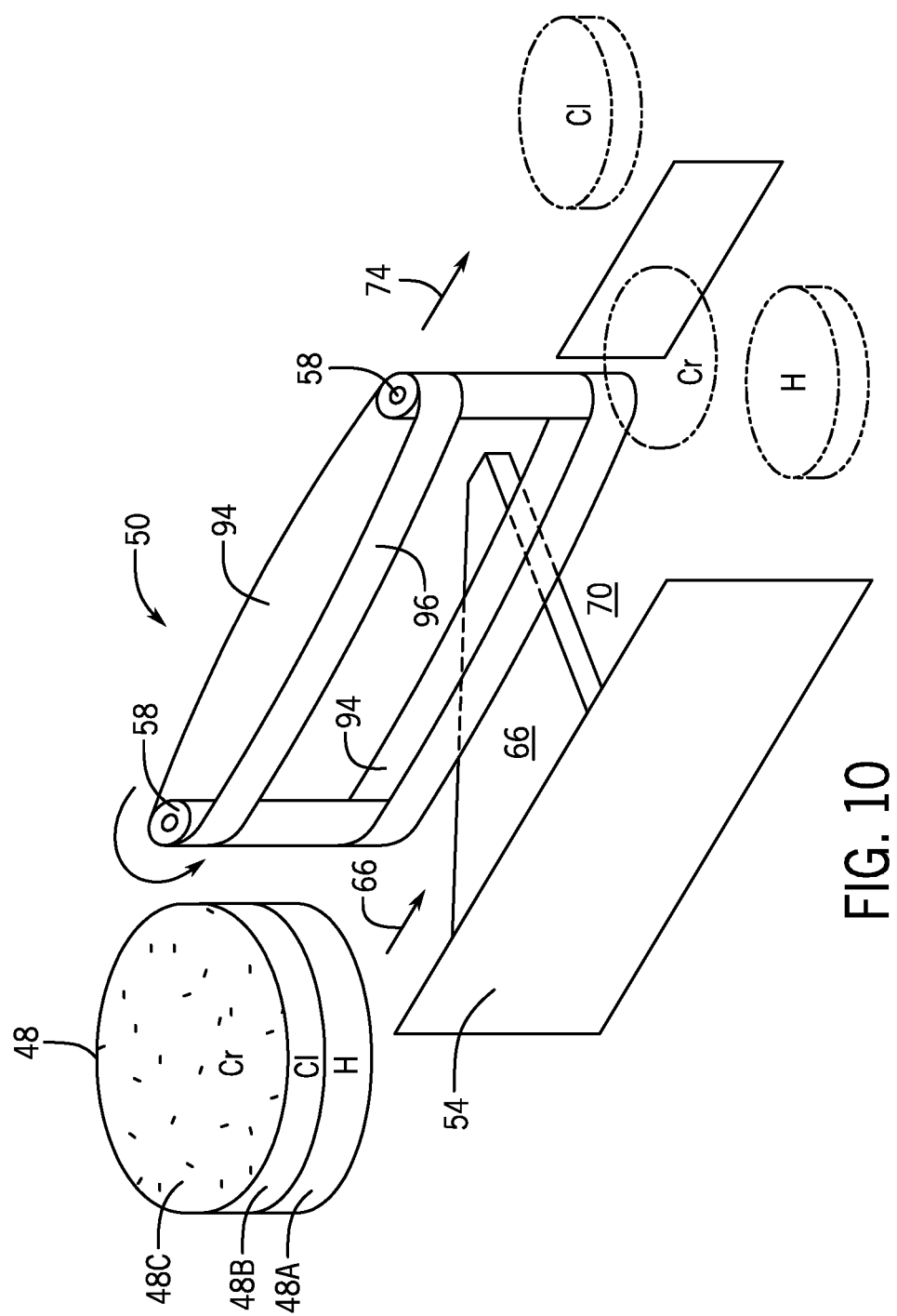
FIG. 10 is a further embodiment of a bun separator configured for separation of club buns.

FIG. 10 depicts a still further exemplary embodiment of a bun separator 50. The bun separator 50 of FIG. 10 is similar to those as depicted in FIG. 4 in which the bun 48 is moved along a feed path 68, which may be a ramp or a conveyor until the bun 48 is placed in a restriction 54 and in engagement with a roller 58. As noted above, the roller 58 may include more than one roller 58 with one or more belts 94 extended therebetween. The roller 58 and the belts 94 engage the bun 48 and advance the bun 48 along the feed path 68. Compression between the roller 58 and the restriction 54 laterally compresses the bun 48 assisting separation of the heel portion 48A, club portion 48B, and crown portion 48C. The bun separator 50 further exemplarily includes a partition 66 which is in the shape of a wedge as an obstruction. The partition 66 exemplarily selectively engages the club portion 48B while the belts 94 maintain engagement with the crown portion 48C and the heel portion 48A. The crown portion 48C and the heel portion 48A move past respective sides of the partition 66 while the partition 66 also extends through an opening 96 between the respective belts 94 and engagement between the partition 66 and the club portion 48B passes the club portion 48B through the opening 96 onto another feed path 74 on an opposite side of the rollers 58.

Figure 11B:
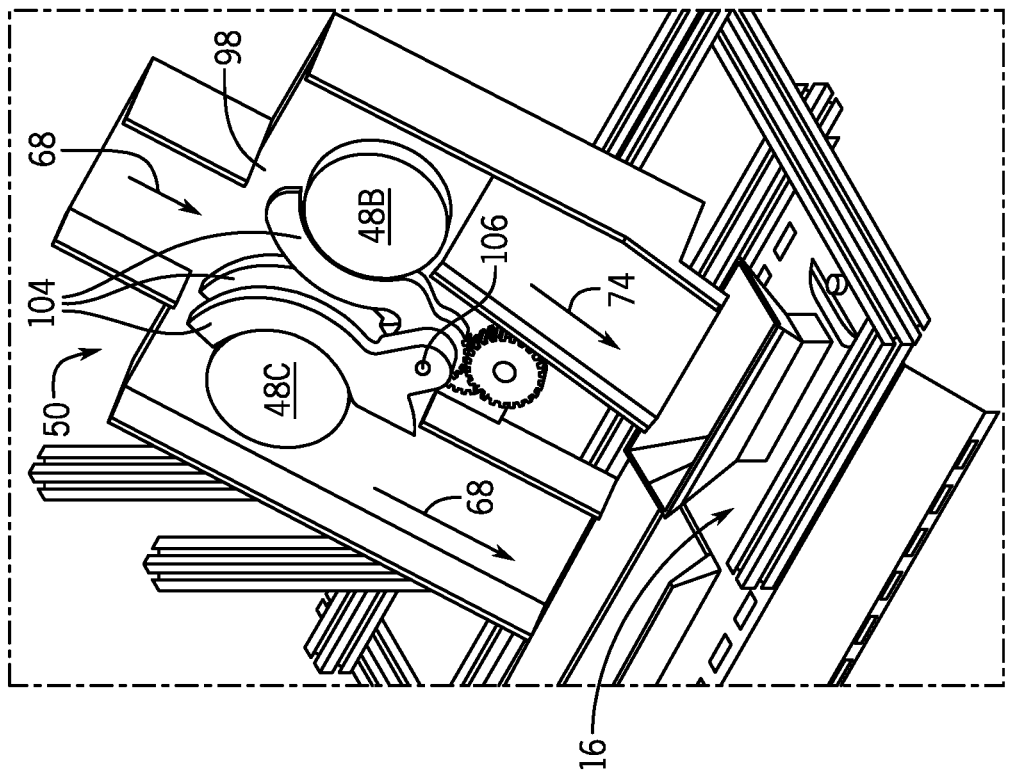
FIGS. 11A and 11B depict operation of a fingered bun separator.
Figure 11A:
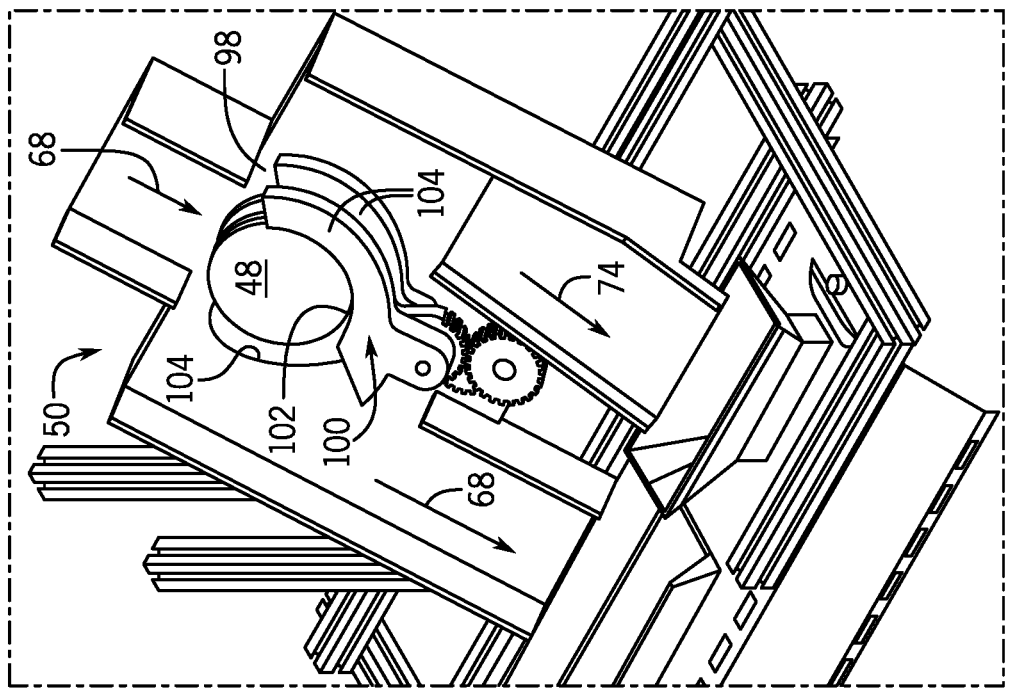

FIGS. 11A and 11B depict a still further exemplary embodiment of a bun separator 50. The bun separator 50 includes a bun feeder in the form of a ramp 98. The ramp 98 conveys the bun 48 by a gravity feed from where the ramp 98 receives the bun and advances the bun along a first feed path 68 until the bun is obstructed by a separation claw 100 forming a cradle 102. The separation claw 100 includes a plurality of fingers 104 with each finger dimensioned and aligned with respect to an associated portion of the bun 48 to be split. The claw 100 is mechanically or electromechanically actuated to move the fingers 104 in translation relative to the ramp 98 and in a pivoting action about a pivot in this embodiment each of the bun portions is simultaneously engaged with the club portion being moved in a direction opposite from the heel portion and the crown portion thus creating a separative force between the portions of the bun. This further directs the club portion 48B into a feed path 74 in alignment with one toasting path while the heel portion and crown portion continue along a feed path 68 down the ramp 98.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A bun separator for separating pre-sliced buns into a plurality of portions, the bun separator comprising:
   a bun feeder configured to receive a pre-sliced bun having a plurality of portions and move the pre-sliced bun along a first feed path;
   an obstruction arranged relative to the first feed path, the obstruction configured to engage at least one portion of the plurality of portions of the pre-sliced bun, wherein the obstruction is a restrictor arranged to laterally constrain a portion of the first feed path; and
   an actuator that operates to selectively engage a least one portion of the plurality of portions of the pre-sliced bun against the obstruction to separate the least one portion of the pre-sliced bun and transfer the at least one portion to a second feed path;
   wherein the actuator comprises a plurality of rollers with a belt extending therebetween.

2. The bun separator of claim 1, wherein the bun feeder is a ramp that moves the pre-sliced bun along the first feed path by gravity.

3. The bun separator of claim 1, wherein the bun feeder is a conveyor operable in an advancing direction to move the pre-sliced bun along the first feed path.

4. The bun separator of claim 1, wherein the obstruction is a partition configured to engage at least one portion of the plurality of portions while permitting another at least one portion of the plurality of portions to pass beyond the partition.

5. The bun separator of claim 4, wherein the partition is arranged adjacent the first feed path.

6. The bun separator of claim 4, wherein the partition is elevated from the first feed path.

7. The bun separator of claim 6, wherein the partition is arranged across the feed path.

8. The bun separator of claim 6, wherein the partition is parallel to the feed path.

9. The bun separator of claim 8, wherein the actuator comprises a pusher that selectively engages a portion of the bun to separate the portions.

10. The bun separator of claim 9, wherein the pusher moves by lateral translation across the first feed path.

11. The bun separator of claim 1, further comprising a holding cabinet connected to the bun feeder, the holding cabinet configured to maintain the pre-sliced buns in a controlled environment and selectively position the pre-sliced buns on the bun feeder.

12. The bun separator of claim 1, further comprising a toaster arranged relative to the first feed path and the second feed path, and the toaster include different toasting arrangements in alignment with the first feed path and the second feed path.

13. The bun separator of claim 12, wherein the toaster comprises a separation plate configured to engage separated crown and heel portions and direct separated crown and heel portions into associated toasting paths within the toaster.

14. The bun separator of claim 1, wherein the pre-sliced bun is a club bun and the plurality of portions comprises a heel, a crown, and a club portion.

15. A bun separator for separating pre-sliced buns into a plurality of portions, wherein the bun is a club bun having a heel, a club, and a crown portion, the bun separator comprising:
- a bun feeder configured to receive a pre-sliced bun having a plurality of portions and move the pre-sliced bun along a first feed path;
- an obstruction arranged relative to the first feed path, the obstruction configured to engage at least one portion of the plurality of portions of the pre-sliced bun, wherein the obstruction is a partition elevated from the first feed path and parallel to the feed path, the partition configured to engage at least one portion of the plurality of portions while permitting another at least one portion of the plurality of portions to pass beyond the partition; and
- an actuator that operates to selectively engage a least one portion of the plurality of portions of the pre-sliced bun against the obstruction to separate the least one portion of the pre-sliced bun and transfer the at least one portion to a second feed path;
- wherein the actuator comprises a pusher that moves by lateral translation across the first feed path is configured to selectively engage a portion of the bun to separate the portions, wherein the pusher comprises:
- a lateral arm that selectively extends across the first feed path; and
- a transverse extension that extends in the direction of the first feed path and comprises an exterior face and an interior face;
- wherein the pusher is configured to extend across the first feed path, engage the heel with the exterior face and push the heel to the second feed path while the club portion drops into contact with the first feed path, and the pusher is configured to then withdraw across the first feed path, engage the club portion with the interior face and pull the club portion to a third feed path while the crown portion drops to the first feed path.

16. A bun separator for separating pre-sliced buns into a plurality of portions, the bun separator comprising:
- a bun feeder configured to receive a pre-sliced bun having a plurality of portions and move the pre-sliced bun along a first feed path;
- an obstruction arranged relative to the first feed path, the obstruction configured to engage at least one portion of the plurality of portions of the pre-sliced bun; and
- an actuator that operates to selectively engage a least one portion of the plurality of portions of the pre-sliced bun against the obstruction to separate the least one portion of the pre-sliced bun and transfer the at least one portion to a second feed path;
- wherein the actuator comprises a pusher with a plurality of fingers that each engage a portion of the pre-sliced bun, and wherein the plurality of fingers are secured to pivot relative to each other across the pre-sliced bun.

17. A bun separator for separating pre-sliced buns into a plurality of portions, the bun separator comprising:
- a bun feeder configured to receive a pre-sliced bun having a plurality of portions and move the pre-sliced bun along a first feed path;
- an obstruction arranged relative to the first feed path, the obstruction configured to engage at least one portion of the plurality of portions of the pre-sliced bun;
- an actuator that operates to selectively engage a least one portion of the plurality of portions of the pre-sliced bun against the obstruction to separate the least one portion of the pre-sliced bun and transfer the at least one portion to a second feed path; and
- a wedge having a front tip and a wedge surface, the wedge secured to an arm in a position that extends across a portion of the first feed path, and the obstruction comprises the front tip of the wedge and the actuator comprises the rotation arm and wedge surface, wherein the wedge is pivotable about an axis of the arm by rotation of the arm to position at least one portion of the pre-sliced bun on the second feed path.

\* \* \* \* \*